Oct. 17, 1939.  J. A. COXE  2,176,247

FISHING REEL

Filed Feb. 27, 1936

Inventor:
Joseph A. Coxe
By Freeman, Sweet, Albrecht & Wadman
Attorneys

Patented Oct. 17, 1939

2,176,247

UNITED STATES PATENT OFFICE 2,176,247

FISHING REEL

Joseph A. Coxe, Los Angeles, Calif., assignor to Bronson Reel Company, Bronson, Mich., a corporation of Michigan Application February 27, 1936, Serial No. 65,944

8 Claims. (Cl. 242—84.6)

My invention relates to fishing reels, and includes among its objects and advantages a type of construction affording greater freedom of design and a larger factor of safety in connection with the click and the click spring.

Figure 1:
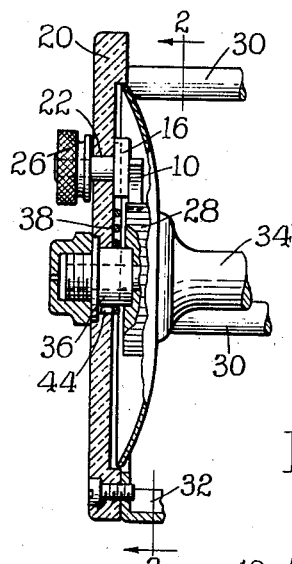
Figure 1 is a partial section on line 1—1 of Figure 2, of a fishing reel embodying the invention.

In the embodiment of the invention selected for illustration, the click member comprises a triangular point portion 10 and a body portion 12 integral therewith. The body portion 12 has flat sides 14 and 16. The point portion and body portion are shown integral with the shaft 18 which is rotatably received in the end plate 20 as at 22. The shaft 18 is continued at 24, and on the continuation 24 is a suitably mounted knurled wheel 26 for rotating the shaft and click member. The body portion 12 is symmetrical about the axis of the shaft 18, but the point portion 10 is not, all as clearly indicated in Figures 2 and 4. Rotation of the click member 180° from the position of Figure 2 and Figure 5 will move the point portion out of the path of the teeth on the click wheel 28.

The end plate 20 forms part of the usual frame completed by pillars 30, seat plate 32, and an opposite end plate not shown. The spool 34 is mounted in the usual way in bearings at 36, which bearings are stationary portions of the frame.

Figure 2:
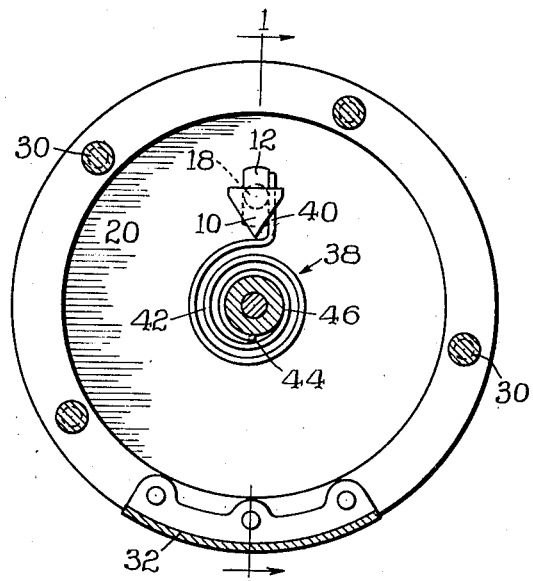
Figure 2 is a section on line 2—2 of Figure 1.
Figure 3:
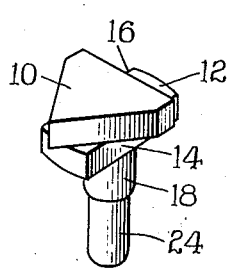
Figure 3 is a perspective of the click member.

In the embodiment selected for illustration in Figures 1 and 2, the spring is indicated as a whole by the reference character 38 and comprises a straight terminal portion 40 bearing against the face 14 of the body member, a plurality of convolutions 42, and a terminal portion 44 turned parallel to the axis of the spool and entering a hole drilled for the purpose in the end plate 20. Immediately adjacent the terminal portion 44 the first convolution 42 snugly embraces the bearing 36 for approximately 270° as indicated at 46. I have indicated the convolutions 42 as all lying in the same plane.

Figure 4:
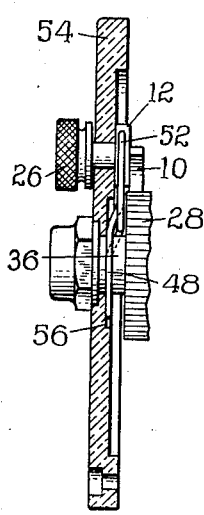
Figure 4 is a section on line 4—4 of Figure 5, illustrating another embodiment.
Figure 5:
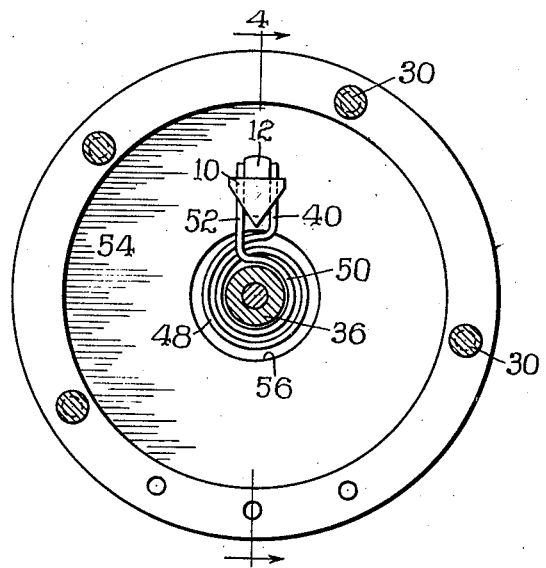
Figure 5 is a section similar to Figure 2, illustrating the embodiment of Figure 4.

In the embodiment selected for illustration in Figures 4 and 5 the click member proper is identical with that in Figures 1 and 2, and also the terminal portion 40. The convolutions 48 end in a convolution 50 of slightly larger diameter than the bearing 36. From the convolution 50 a second terminal member 52 extends outward and lies against the face 16 of the body member 12. Thus the spring is not fastened to the end plate at all, but merely lies in place, each of the terminals 52 and 40 furnishing a fulcrum for the force exerted by the other, and the inner convolution 50 bearing loosely against the outer surface of the bearing 36 to prevent rotation of the spring as a whole about the shaft 18 as a center.

I have also indicated an end plate 54 with a central depression 56 housing the convolutions 48 and 50 to secure a more compact arrangement so far as axial dimensions are concerned.

In the prior art it has been customary to employ resilient members fastened in place to the end plate as by clips or machine screws. Such members have also customarily comprised only a single resilient reach, as distinguished from a plurality of coiled convolutions. In such constructions the resilient reach is nearly always loaded fully up to or beyond its elastic limit, and after a short period of use it acquires a permanent set and the click becomes loose and does not function properly. The type of construction herein disclosed makes it possible to use a spring of any desired stiffness and then, by the use of a plurality of convolutions, reduce the distortion of the spring well below its elastic limit. The holding of the spring in assembled position merely by placing it in that position also contributes very materially to cheapness and convenience in manufacture and assembly, as well as ease of replacement, which, however, is rarely necessary.

Without further elaboration the foregoing will so fully explain my invention that others may, by applying knowledge current at the time of application, readily adapt the same for use under various conditions of service.

I claim:

1. In a fishing reel, a combination: a frame; a spool; a journal in said frame coaxial with the spool for rotatably supporting the spool; a click wheel on said spool near one end thereof; a click member mounted in the frame adjacent the click wheel; mounting means permitting said click member to move into different positions; said click member having a point adapted to engage the teeth of said wheel; and resilient means tending to hold said click member in any one of a plurality of different positions; said point, in one of said positions, lying in operative position, and in another of said positions lying in inoperative position; said resilient means comprising a coil spring of a plurality of convolutions, one of said convolutions closely encircling the adjacent journal; said spring having terminal portions extending away from said convolutions and engaging said click member; said click member having flattened side portions against each of which one of said terminal portions presses; said click member being rotatable with respect to said frame, into its operative and inoperative position; said positions being separated by an interval of rotation of 180°.

2. In a fishing reel, in combination: a frame; a spool; means in said frame coaxial with the spool for rotatably supporting the spool; a click member mounted in one end of said frame; a click wheel adjacent the click member; said click member having a point adapted to engage the teeth of said wheel; and resilient means tending to hold said click member in any one of a plurality of different positions; said point, in one of said positions, lying in operative position, and in another of said positions lying in inoperative position; said resilient means comprising a coil spring of a plurality of convolutions; said spring having terminal portions extending away from said convolutions and engaging said click member; said click member having a flattened side portion against which each terminal portion presses; said frame having a stationary portion spaced from said click member; one of the convolutions of said spring encircling said stationary portion.

3. In a fishing reel, in combination: an end plate; a rotary click wheel spaced from said end plate; a spring of a plurality of convolutions housed between said wheel and end plate, said spring having a projecting terminal; a click member including a point portion in the plane of said wheel, and a body portion between said point portion and said end plate; said click member being movably mounted on said end plate, and movable by rotation into operative and inoperative positions; said body portions having flat faces engaged by said terminal in either inoperative or operative positions, and in either position tending to hold said click member in the assumed position; said spring having a second terminal bearing against another portion of the click body to afford a fulcrum for the force exerted by the first terminal.

4. In a fishing reel, in combination: an end plate; a rotary click wheel spaced from said end plate; a spring of a plurality of convolutions housed between said wheel and end plate, said spring having a projecting terminal; a click member including a point portion in the plane of said wheel, and a body portion between said point portion and said end plate; said click member being movably mounted on said end plate, and movable by rotation into operative and inperative positions; said body portions having flat faces engaged by said terminal in either inoperative or operative positions, and in either position tending to hold said click member in the assumed position; said spring having a second terminal fastened in said end plate; said frame including a cylindrical portion adjacent said fastened terminal and encircled by the spring convolution adjacent said second terminal, to afford a fulcrum for the force exterted by said first terminal.

5. In combination with a fishing reel comprising a frame having an end and a spool journaled in said frame: a supporting shaft journaled in said frame end for rotation on an axis parallel to the axis of rotation of said spool but offset laterally therefrom; externally projecting means in the nature of a knurled head, for manually rotating said shaft; a spring member inside said frame having an end portion resiliently pressing against said shaft; said shaft having a polygonal portion positioned to receive the force of said spring, whereby said spring tends to hold said shaft in predetermined positions corresponding to the faces of said polygonal shaft portion; said shaft including a radially projecting point; and a toothed wheel carried by said spool with its teeth positioned in the plane of said radially projecting point; said polygonal shaft portion having one flat face positioned to coact with said spring end portion and hold said radially projecting point resiliently in the path of the teeth of said toothed wheel, and another flat face positioned to coact with said spring end portion and hold said radially projecting point resiliently out of the path of the teeth of said toothed wheel; said faces being substantially parallel and on opposite sides of said polygonal portion, whereby said radially projecting point is held by said spring and faces in either of two positions separated by 180° rotation of said shaft; said spring comprising a single piece of wire having one end anchored to said frame and a resilient arcuate portion between the anchored end and the end engaging said shaft.

6. In combination with a fishing reel comprising a frame having an end and a spool journaled in said frame: a supporting shaft journaled in said frame end for rotation on an axis parallel to the axis of rotation of said spool but offset laterally therefrom; externally projecting means for manually rotating said shaft; a spring member inside said frame having an end portion resiliently pressing against said shaft; said shaft having a polygonal portion positioned to receive the force of said spring, whereby said spring tends to hold said shaft in predetermined positions corresponding to the faces of said polygonal shaft portion; said shaft including a radially projecting point; and a toothed wheel carried by said spool with its teeth positioned in the plane of said radially projecting point; said polygonal shaft portion having one flat face positioned to coact with said spring end portion and hold said radially projecting point resiliently in the path of the teeth of said toothed wheel, and another flat face positioned to coact with said spring end portion and hold said radially projecting point resiliently out of the path of the teeth of said toothed wheel; said spring comprising a single piece of wire having one end anchored to said frame and a resilient arcuate portion between the anchored end and the end engaging said shaft.

7. In combination with a fishing reel comprising a frame having an end and a spool journaled in said frame; a supporting shaft journaled in said frame end for rotation on an axis parallel to the axis of rotation of said spool but offset laterally therefrom; externally projecting means for manually rotating said shaft; a spring member inside said frame having an end portion resiliently pressing against said shaft; said shaft having a polygonal portion positioned to receive the force of said spring, whereby said spring tends to hold said shaft in predetermined positions corresponding to the faces of said polygonal shaft portion; said shaft including a radially projecting point; and a toothed wheel carried by said spool with its teeth positioned in the plane of said radially projecting point; said polygonal shaft portion having one flat face positioned to coact with said spring end portion and hold said radially projecting point resiliently in the path of the teeth of said toothed wheel, and another flat face positioned to coact with said spring end portion and hold said radially projecing point resiliently out of the path of the teeth of said toothed wheel; said faces being substantially parallel and on opposite sides of said polygonal portion, whereby said radially projecting point is held by said spring and faces in either of two positions separated by 180° rotation of said shaft.

8. In combination with a fishing reel comprising a frame having an end and a spool journaled in said frame: a supporting shaft journaled in said frame end for rotation on an axis parallel to the axis of rotation of said spool but offset laterally therefrom; externally projecting means for manually rotating said shaft; a spring member inside said frame having an end portion resiliently pressing against said shaft; said shaft having a polygonal portion positioned to receive the force of said spring, whereby said spring tends to hold said shaft in predetermined positions corresponding to the faces of said polygonal shaft portion; said shaft including a radially projecting point; and a toothed wheel carried by said spool with its teeth positioned in the plane of said radially projecting point.

JOSEPH A. COXE.